W. M. WHEILDON.
DELIVERING MATERIAL FROM ROLLS.
APPLICATION FILED JULY 21, 1919.
1,409,505.
Patented Mar. 14, 1922.
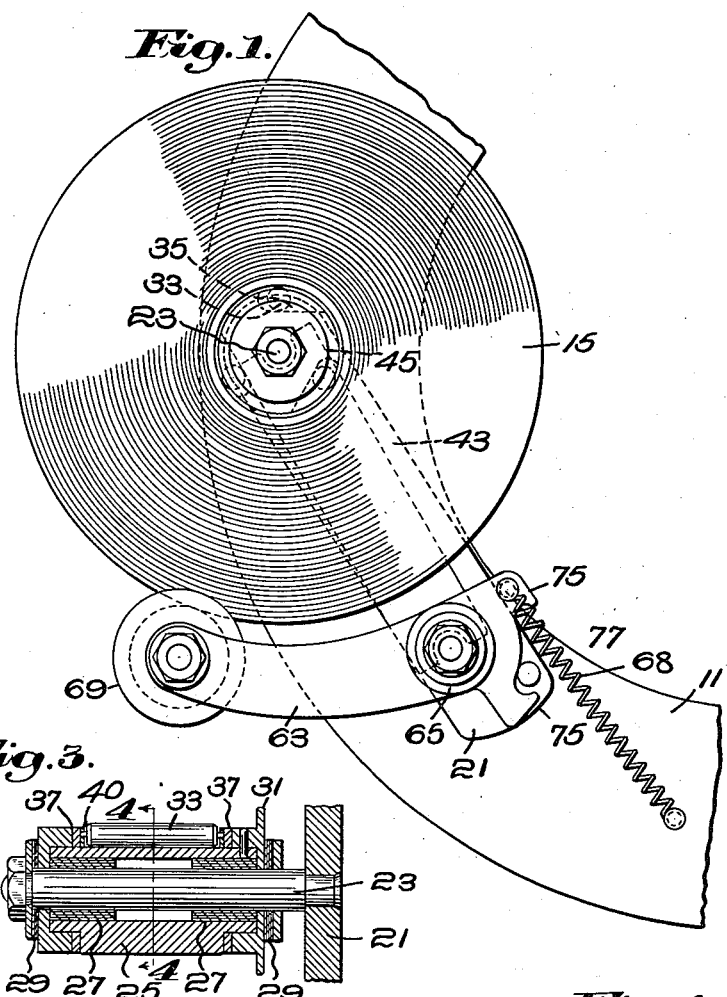
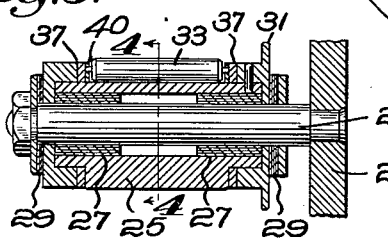
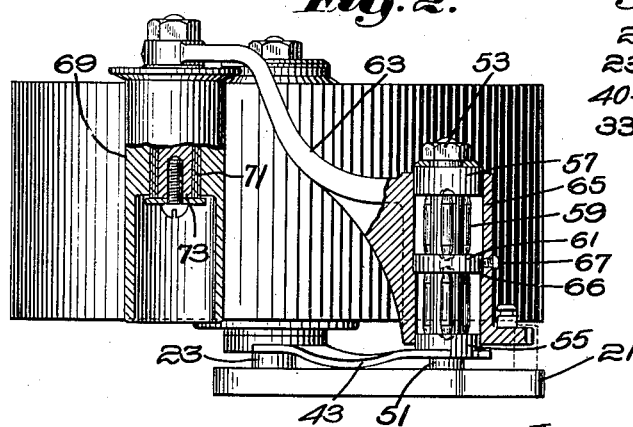
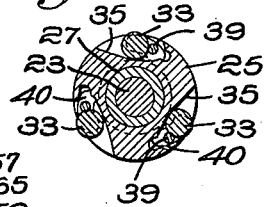
Inventor:
William M. Wheildon
by Emery, Booth, Janney & Varney
Attys.

UNITED STATES PATENT OFFICE.

WILLIAM M. WHEILDON, OF ASHLAND, MASSACHUSETTS, ASSIGNOR TO EDWARD H. ANGIER, OF FRAMINGHAM, MASSACHUSETTS.

DELIVERING MATERIAL FROM ROLLS.

1,409,505.

Specification of Letters Patent. Patented Mar. 14, 1922.

Application filed July 21, 1919. Serial No. 312,389.

*To all whom it may concern:*

Be it known that I, WILLIAM M. WHEILDON, a citizen of the United States, and a resident of Ashland, in the county of Middlesex and Commonwealth of Massachusetts, have invented an Improvement in Delivering Material from Rolls, of which the following description, in connection with the accompanying drawings, is a specification, like characters on the drawings representing like parts.

This invention relates to mechanisms for controlling the feed of material from rolls and in particular to a means governing the tension under which the material unwinds. The invention is herein disclosed as applied to a machine of the type having a revolving head or shuttle on which the roll is carried and which is designed for use in wrapping tires with a relatively narrow strip of paper and for convenience I have here shown and will describe the invention in connection with such a tire wrapping machine.

My invention will best be understood by reference to the following description of the illustrative embodiment thereof taken in connection with the accompanying drawings wherein:

Figure 1 is a front elevation of a fragment of the rotary shuttle of a tire wrapping machine showing the roll of wrapping material mounted thereon and the controlling mechanism therefor;

Fig. 2 is a bottom plan of the parts shown in Fig. 1, the shuttle being omitted and parts being in section;

Fig. 3 is a longitudinal section through the roll-carrying hub; and

Fig. 4 is a section of the line 4—4 of Fig. 3.

I have herein disclosed my invention and applied to a wrapping machine for wrapping tires to form, for example, such a package as is shown in Patent 1,282,167, dated October 26, 1918, to Edward H. Angier. Machines of the general type are well known and I may refer to Patent No. 351,584, dated October 26, 1886, to J. A. Dixon for a disclosure of the fundamental principles involved although machines of the present day are, as is to be expected, of more refined construction. Essentially the machine embodies a ring-like shuttle 11 (Fig. 1) which is rotated around the cross section of the tire or like article carrying with it a roll 15 of wrapping strip while the tire itself is rotated and fed through the eye of the shuttle. The end of the wrapping strip is applied to the tire and the strip is drawn from the roll and wrapped around the tire by the revolution of the shuttle.

When making the package described in the patent to E. H. Angier referred to, it is desirable to apply the wrapping strip under considerable tension to partially expand the resilient gatherings of the wrapping material and form a wrapping tightly drawn about the tire or other article. It will be apparent, however, that when the roll of material is large, a much greater torque is exerted than when it is small and consequently a resistance to unwinding of the roll which would adequately tension the material when the roll is new may be unduly large after a considerable amount of the strip has been unwound. The present invention contemplates the provision of suitable means for automatically varying the tension to compensate for the reduction in turning moment as the material is unwound.

Referring more particularly to Figs. 1 and 2, the roll-carrying mechanism and the tensioning means, which takes the form of an adjustable brake restraining the unwinding movement of the strip, is herein organized as a unit carried on a base plate 21 which may be mounted on the shuttle 11. From one end of this plate 21 projects a spindle 23 for supporting the roll, this spindle being best shown in Fig. 3. The roll turns on the spindle 23 through the medium of a sleeve or hub 25 preferably provided with the interior bushings 27 of oil-impregnated wood and having end bearings in the form of washers 29 of the same material. The roll of wrapping material, which is usually mounted on a core of cardboard or the like, may be slipped on over this hub from the left viewing Fig. 3 and may rest against the flange portion 31 which is pinned to the inner end of the hub proper and serves to position the roll as regards movement toward the shuttle.

In the present example of my invention, the rotation of the roll is controlled by a suitable braking force applied to this hub and it is desirable to concentrate all the rotating movement on the bearing between the spindle and the hub, and for this purpose the hub is formed to interlock with the core of the roll which is placed thereon and to which the wrapping strip itself may be suitably secured. Herein this is effected by suitable gripping elements which are drawn outwardly to clutch the roll to the hub when draft is applied to the roll in the winding operation. I have shown these gripping elements as taking the form of rollers 33 housed in grooves 35 which extend lengthwise of the hub and are tapered circumferentially thereof. Herein the rollers are supported by a sort of cage comprising washers 37 at opposite ends of the hub connected by rods or trundles 39 (Fig. 4) housed in the grooves. Pivoted to the trundles 39 are arms 41 to which the rollers 33 are journalled, herein by trunnions formed on the latter. By these means the rollers 33 are held in position but the entire cage may move circumferentially and if the core of the roll tends to turn about the hub 25 in a counterclockwise direction viewing Fig. 4, the rollers 33 will be drawn outwardly in the tapering grooves and grip the core of the roll and prevent it from rotating on the hub. The arms 40 and the ends of the hub may be formed with suitable cooperating stop surfaces, as shown at 41 in Fig. 4, to maintain the rollers in contact with the bottoms of the grooves when no core is in position.

By the means thus described the entire rotary movement of the roll as the material is drawn therefrom is concentrated on the bearing of the hub 25 on the spindle 23 and it will be clear that the resistance to unwinding movement may be controlled by a suitable brake applied to the hub. Herein braking force is applied by endwise pressure exerted against the inner washer 29, of oil-impregnated wood and the brake shoe may take the form of a spring-pressed lever 43 which conveniently, as here shown, may be a lever which itself is a spring, the spring as shown in Fig. 2 having a bifurcated end 45 embracing the spindle 23 and bearing on the washer 29, as shown in Fig. 3. The spring 43 may be bowed to provide a fulcrum bearing therefor on the base plate 21 (see Fig. 2). A braking force is exerted on the hub through the spring 43 by pressure exerted on the opposite end of the spring and in the present instance means are provided for governing this pressure in correlation with the feed of the material from the roll. The particular construction of such means which I have here shown by way of example, I shall next describe.

At the opposite end of the spring 43 I have shown a spindle 51 projecting from base plate 21 (see Fig. 2). This spindle may serve as a support for means for applying a thrust against the end of the spring lever, this thrust being conveniently regulated by a nut 53 on the outer end of the spindle. The pressure-applying mechanism herein illustrated is best shown in Fig. 2 and may comprise an inner washer 55 adapted to bear on the end of the spring and an outer washer 57 against which rests nut 53; and between these washers are suitable pressure-applying struts 59. Herein I have shown two sets of these struts forming, as will hereinafter appear, a toggle mechanism, an inner set of struts interposed between the washer 55 and an intermediate washer 61, and an outer set of struts between the intermediate washer 61 and the outer washer 57. There may be three of these pairs of struts 59 disposed at equal intervals around the spindle and they herein take the form of pins having rounded ends resting in suitable recesses in the washers. It will be understood that when the struts 59 are parallel to the axis of the spindle 51, as shown in Fig. 2, they will constitute thrust members by which a pressure applied by setting up the nut 53 may be exerted on the end of the spring bar 43 to apply a suitably regulated braking pressure to the hub. If, however, the intermediate washer 61 be rotated, for instance clockwise in Fig. 1, while the end washers 55 and 57 are held in position by the keys on the spindle 51, the struts will be rocked angularly and occupy a less space from end to end, the action of the double set of struts shown being similar to the breaking of a toggle; and this will permit the end of the spring 43 to move upwardly viewing Fig. 2, thus relaxing somewhat the braking pressure on the spring. I herein provide for rotation of the intermediate washer 61 about the spindle 51 by a mechanism governed by the size of the roll.

This governing action is herein effected by a suitable feeler arm 63 having a hub 65 receiving the three washers referred to and adapted to turn on the end washers 55 and 57 as bearings. The intermediate washer 61 may turn with the hub about the spindle 51 and I have here shown this washer as somewhat larger than the others and inserted in the hub 65 with a driving fit against the shoulders 66 therein and also as secured against rotation in the hub by the screw 67. The end of the feeler arm is adapted to be positioned by contact with the outer circumference of the roll 15, being drawn toward the same by a suitable spring 68. The arm may bear upon the roll through the medium of a roller 69 provided with a bushing 71 of oil impregnated wood which turns on the journal 73 projecting inwardly from the arm. The swinging movement of the feeler arm may be limited by the stops 75 cooperating with the stop pin 77 projecting from the face of the shuttle and in such an instance as is here shown wherein the entire mechanism revolves bodily and is consequently subjected to centrifugal force the weight of the parts and the strength of the spring 68 are so adjusted as to balance the effect of centrifugal force at normal speed so that the roller 69 is constantly in contact with the outer surfaces of the roll 15 of wrapping material during the action of the machine.

When the roll 15 is first put on, the struts may be straight in the position shown in Fig. 2 and any desired tension placed upon the brake spring. As the roll is unwound and the unwinding torque diminishes the feeler arm 63 will be permitted to swing inwardly in a clockwise direction viewing Fig. 1, rotating washer 61 and annularly swinging the thrust members. The toggle formed by these strut members will be partially broken and since the outer washer 67 is stationary the inner washer will be permitted to move upwardly and the tension of the spring will be correspondingly relaxed. There is thus effected a continuous reduction of the braking force as the material unwinds from the roll which reduction corresponds to the decrease in unwinding torque.

The construction herein disclosed is in some respects similar to that disclosed in my co-pending application, Ser. No. 312388, filed July 21, 1919, and in that application I have claimed generically certain principles embodied in the construction shown in the present application. This present application is subsidiary to the one referred to and herein I claim only a construction wherein the braking tension on the roll is continuously reduced as the unwinding proceeds. Generic claims covering such a mechanism among others will be found in my co-pending application referred to.

I have thus described in detail the specific form of my invention herein illustrated. It will be understood, however, that I have been thus specific in order that the disclosed embodiment might be clearly understood and not because all the details herein shown and described are essential to the principles of my invention.

What I consider new and desire to secure by Letters Patent I shall express in the following claims:—

1. In combination with a suitable support, a spindle projecting therefrom, a hub journalled on the spindle and over which a roll of material may be placed from the outer end opposite the support, a brake interposed between said support and the inner end of the hub and exerting a pressure on the latter lengthwise of the spindle and means governed by the size of the roll for effecting a continuous reduction of the pressure of said brake on the hub as the size of the roll on said hub diminishes.

2. In combination with a suitable support a spindle carried thereby, a roll-carrying hub rotatable on the spindle, a spring pressed lever fulcrumed on the support and having an end bearing on said hub, a spindle at the outer end of the lever, inner and outer plates keyed to the spindle, an intermediate plate free to turn thereon, thrust members between said plates, a feeler arm for turning said intermediate plate and means for maintaining the arm constantly in contact with a roll on the hub.

3. In combination with a suitable support a spindle carried thereby, a roll carrying hub rotatable on the spindle, a spring pressed lever fulcrumed on the support and having an end bearing on said hub, a spindle at the outer end of the lever, inner and outer plates keyed to the spindle, an intermediate plate free to turn thereon, thrust members between said plates, a nut on the spindle cooperating with said outer plate, a feeler arm for turning said intermediate plate and means for maintaining the arm constantly in contact with a roll on the hub.

4. Means for controlling the feed of material from rolls comprising a hub to receive the roll, a resiliently operated brake therefor and means for operating the brake comprising a feeler arm having a hub and a pressure transmitting strut having one end arranged to turn with that hub and the other relatively fixed, said arm arranged to be maintained in uninterrupted contact with a roll on the hub.

5. Means for controlling the feed of material from rolls comprising a pivoted feeler arm arranged for uninterrupted contact with the surface of the roll, a thrust member in the form of a strut having one end movable with said arm and the other relatively fixed, and brake means for the roll tensioned by said member.

6. Means for controlling the feed of material from rolls comprising a brake for the roll, means for applying pressure to the same comprising relatively fixed and movable abutments and an interposed strut and means for continuously shifting the movable abutment as the roll diminishes in size to vary the action of the strut.

7. Means for controlling the feed of material from rolls comprising a brake for the roll, means for applying pressure to the same comprising a rotatable and a non-rotatable abutment and an interposed strut and means for continuously rotating the former as material feeds from the roll.

8. Means for controlling the feed of material from rolls comprising a rotary carrier for the roll, a brake therefor including a spring pressed lever, a spindle at an end of the lever, means organized about said spindle for applying pressure to the lever and comprising a controlling member rotatable thereon and means for continuously rotating said member as material feeds from the roll.

In testimony whereof, I have signed my name to this specification.

WILLIAM M. WHEILDON.